US000001928H

United States Statutory Invention Registration [19]

[11] Reg. Number: H1,928

Singer

[45] Published: Dec. 5, 2000

[54] HIGH VISCOSITY, SOLVENT RESISTANT, THERMOSET POLYETHERPOLYURETHANE AND A PROCESS FOR MAKING THE SAME

[75] Inventor: Stephen M. Singer, Brimfield, Ill.

[73] Assignee: Caterpillar Inc., Peoria, Ill.

[21] Appl. No.: 09/075,759

[22] Filed: May 11, 1998

[51] Int. Cl.[7] ..... C08G 18/30

[52] U.S. Cl. ..... 528/44; 528/60; 528/83

[56] References Cited

U.S. PATENT DOCUMENTS

| | | | |
|---|---|---|---|
| 3,169,934 | 2/1965 | Dennett et al. | 260/2.5 |
| 3,304,273 | 2/1967 | Stamberger | 260/2.5 |
| 3,383,351 | 5/1968 | Stamberger | 260/33.2 |
| 3,594,352 | 7/1971 | Lloyd et al. | 260/77.5 |
| 3,953,393 | 4/1976 | Ramlow et al. | 260/31.8 |
| 3,993,576 | 11/1976 | Barron | 252/182 |
| 4,036,906 | 7/1977 | Finelli | 260/830 |
| 4,143,004 | 3/1979 | Stromblad et al. | 521/174 |
| 4,146,723 | 3/1979 | Findeisen et al. | 548/307 |
| 4,198,238 | 4/1980 | Scheve | 430/286 |
| 4,202,957 | 5/1980 | Bonk et al. | 528/77 |
| 4,247,678 | 1/1981 | Chung | 528/83 |
| 4,324,716 | 4/1982 | Reischl et al. | 524/761 |
| 4,374,209 | 2/1983 | Rowlands | 521/116 |
| 4,385,133 | 5/1983 | Alberino et al. | 521/159 |
| 4,394,491 | 7/1983 | Hoffman | 525/452 |
| 4,400,498 | 8/1983 | Konishi et al. | 528/60 |
| 4,460,715 | 7/1984 | Hoffman et al. | 521/137 |
| 4,487,913 | 12/1984 | Chung | 528/83 |
| 4,522,979 | 6/1985 | Chung et al. | 525/66 |
| 4,543,276 | 9/1985 | Parekh | 427/388.3 |
| 4,581,418 | 4/1986 | Serratelli et al. | 525/404 |
| 4,607,064 | 8/1986 | Kuhn et al. | 521/174 |
| 4,668,535 | 5/1987 | Liggett et al. | 427/230 |
| 4,713,399 | 12/1987 | Webb et al. | 521/110 |
| 4,728,711 | 3/1988 | Rosthauser et al. | 528/73 |
| 4,745,170 | 5/1988 | Bushman et al. | 528/61 |
| 4,767,825 | 8/1988 | Pazos et al. | 525/408 |
| 4,826,855 | 5/1989 | Tsai | 521/176 |
| 4,831,076 | 5/1989 | Lidy et al. | 524/701 |
| 4,883,832 | 11/1989 | Cloetens et al. | 524/265 |
| 5,001,167 | 3/1991 | Wiltz, Jr. et al. | 521/174 |
| 5,010,117 | 4/1991 | Herrington et al. | 521/159 |
| 5,237,036 | 8/1993 | Spitzer | 528/67 |
| 5,468,835 | 11/1995 | Singer | 528/76 |

FOREIGN PATENT DOCUMENTS

| | | | |
|---|---|---|---|
| 1133650 | 5/1981 | Canada | 400/105 |

OTHER PUBLICATIONS

"Polyurethane Elastomers", C. Hepburn, Applied Science Publishers.

Polyurethane Polyols, Dow Chemical Co. Voranol CP 5021 Polyol.

Urethane Polyols, Dow Chemical Co., Voranol CP 1421 Polyol.

*Primary Examiner*—Peter A. Nelson

*Attorney, Agent, or Firm*—Kevin M. Kercher; Josepth W. Keen; Calvin E. Glastetter

[57] ABSTRACT

A high viscosity, solvent-resistant, thermoset polyetherpolyurethane molded article that includes a methylene-bridged polyarylpolyisocyanate component and a polyether polyol solution combined in catalytic urethane-forming reaction where the polyether polyol solution of the urethane-forming reaction includes a diol first component, a polyether polyol second component, a polyether polyol third component, and a polymer polyol fourth component having a nonaqueous dispersant stabilizer.

20 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

HIGH VISCOSITY, SOLVENT RESISTANT, THERMOSET POLYETHERPOLYURETHANE AND A PROCESS FOR MAKING THE SAME

TECHNICAL FIELD

This invention relates generally to an improved polyetherpolyurethanes and more particularly to a high viscosity, solvent resistant, thermoset polyetherpolyurethane.

BACKGROUND ART

Currently, polyether and polyester based polyurethanes are utilized for a wide variety of molded articles. An illustrative but nonlimiting example of this type of molded article would include an end cap for a filter. Both the polyether material and polyester material have a tendency to degrade in oil or fuel solutions. Polyetherpolyurethane material was developed for improved chemical resistance in oil and fuel environments and is remarkably durable in these applications. However, the polyetherpolyurethane material has a very low viscosity that creates tremendous processing problems. In production, speed is of the essence. Therefore, the mold must be moved at a very rapid rate of speed. It is this movement that causes low viscosity polyetherpolyurethane to slosh within the mold so that the molded article will not have a smooth and consistent finish. This sloshing will create variance not only in the thickness of the molded article but also in the appearance of the molded article. In addition, thinly cured pieces of polyurethane (flash), can also be created due to the sloshing of the low viscosity fluid. This flash can break-off from the end cap, which can inhibit the flow of oil or fuel through the filter or through the engine.

The present invention is directed to overcoming one or more of the problems set forth above.

DISCLOSURE OF THE INVENTION

In one aspect of the present invention, a high viscosity, solvent-resistant, thermoset polyetherpolyurethane, is disclosed. The polyetherpolyurethane is a methylene-bridged polyarylpolyisocyanate component and a polyether polyol solution combined in a catalytic urethane-forming reaction where the polyether polyol solution of the urethane-forming reaction includes a diol first component from about 2% to about 20% by weight of the polyether polyol solution having a molecular weight from about 75 to about 200; a polyether polyol second component from about 0% to about 75 by weight of the polyether polyol solution having no oxyethylene groups, a functionality greater than 2 and a hydroxyl number from about 30 to about 60; a polyether polyol third component from about 0% to about 75% by weight of the polyether polyol solution having no oxyethylene groups, a functionality greater than 2 and a hydroxyl number from about 170 to about 110; and a polymer polyol fourth component, from about 80% to about 10% by weight of the polyether polyol solution having a hydroxyl number from about 20 to about 100 and having a nonaqueous dispersant stabilizer.

In another aspect of the present invention, a process for molding a high viscosity, solvent-resistant, thermoset polyetherpolyurethane is disclosed. The process includes the steps of mixing a diol first component from about 2% to about 20% by weight of a polyether polyol solution having a molecular weight from about 75 to about 200 with a polyether polyol second component from about 0% to about 75% by weight of the polyether polyol solution having no oxyethylene groups, a functionality greater than 2 and a hydroxyl number from about 30 to about 60 with a polyether polyol third component from about 0% to about 75% by weight of the polyether polyol solution having no oxyethylene groups, a functionality greater than 2 and a hydroxyl number from about 170 to about 110 with a polymer polyol fourth component, from about 80% to about 10 by weight of the polyether polyol solution having a hydroxyl number from about 20 to about 100 forming a polyether polyol solution and having a nonaqueous dispersant stabilizer, mixing a methylene-bridged polyarylpolyisocyanate component and the polyether polyol solution with a catalyst forming a polyetherpolyurethane and discharging the polyetherpolyurethane into a heated mold.

BEST MODE FOR CARRYING OUT THE INVENTION

In accordance with this invention, an improved molded article, for example, oil filter end cap, is prepared from a thermoset polyetherpolyurethane elastomer which involves the catalyzed reaction of a methylene-bridged polyarylpolyisocyanate component with a particular polyether polyol solution. This polyether polyol solution results in an improved high viscosity, solvent resistant, polyetherpolyurethane of this invention.

This polyether polyol solution includes a diol first component from about 2% to about 20% by weight of the polyether polyol solution having a molecular weight from about 75 to about 200; a polyether polyol second component from about 0% to about 75% by weight of the polyether polyol solution having no oxyethylene groups, a functionality greater than 2 and a hydroxyl number from about 30 to about 60; a polyether polyol third component from about 0% to about 75% by weight of the polyether polyol solution having no oxyethylene groups, a functionality greater than 2 and a hydroxyl number from about 170 to about 110; and a polymer polyol fourth component, from about 80% to about 10% by weight of the polyether polyol solution having a hydroxyl number from about 20 to about 100 and having a nonaqueous dispersant stabilizer.

This polymer polyol fourth component is formed from two polymers that are in solution at the same time. The first polymer is a high molecular weight (typically low viscosity) polyether polyol. The second polymer is a styrene-acrylonitrile polymer. This styrene-acrylonitrile polymerization takes place in a solution of the polyether polyol. The styrene-acrylonitrile polymer will stay both suspended in solution as well as dispersed in the solution. This polyether polyol has a nonaqueous dispersant stabilizer and contains deliberately added unsaturation, which is able to copolymerise with or graft onto the growing polymer chains thereby forming a steric hindrance which prevents the agglomeration of polymer particles.

The polyether polyol second component and the polyether polyol third component have viscosities in the range of about 100 to about 5,000 centipoise at ambient temperature, and preferably have viscosities in the range of 100 to 1,000 centipoises. The polymer polyol fourth component has a viscosity in the range of about 2000 to about 12,000 centipoise and preferably has a viscosity in the range of about 5,000 to about 7,000 centipoise at ambient temperature.

The polyether polyols useful in the practice of this invention are prepared by reacting an alkylene oxide having three or more carbon atoms, preferably propylene oxide, with a polyhydric initiator. The polyether polyol takes on the functionality of the initiator, originally reacted with the alkylene oxide, preferably propylene oxide. The reaction, well-known to those skilled in the art, continues until the desired molecular weight, as demonstrated by the hydroxyl number, is obtained. Suitable initiators, catalyst, and reaction are well-known and need not be specifically described herein.

During the preparation of the polymer polyol fourth component, a polymer is produced in the liquid base polyol by polymerization of the monomer or monomers. The monomers are suitably vinyl monomers, for example, styrene, acrylonitrile, methacrylonitrile and methyl methacrylate. Preferably, a mixture of styrene and acrylonitrile is used to produce a copolymer. The polymer polyether polyol solution is suitably one having more than 10 percent (10%) and less than 80 percent (80%) by weight polymer polyol fourth component present and is preferably one having between 30% and 70% by weight polymer polyol fourth component and more preferably about 40% by weight polymer polyol fourth component. With regard to the relative amount of styrene and acrylonitrile in the copolymer, it is desirable for reasons of cost to be able to maximize the level of styrene present. Therefore, the copolymer should preferably contain between 50% and 100% styrene on a molar basis and more preferably about 70%. Therefore, the relative amount of acrylonitrile in the copolymer should preferably contain between 0% and 50% acrylonitrile on a molar basis and more preferably about 30% acrylonitrile with the preferred ratio of styrene to acrylonitrile being 70:30.

The polymerization reaction, for example, between acrylonitrile and styrene, is limited by means of a free radical initiator. The free radical initiator can be any of those which are routinely used in vinyl polymerization processes including peroxides, perborates, persulphates, percarbonates, and azo compounds. Typical examples of such free radical initiators include alkyl and aryl hydroperoxides, dialkyl and diaryl peroxides, dialkyl peroxydicarbonates and azobis (nitriles). Preferred free radical initiators are azobis (isobutyronitrile) and bis(4-terbutylcyclohexyl) peroxydicarbonate (PERKADOXO® manufactured by Akzo Nobel Chemicals Inc. located at 5 Livingston Avenue, Dobbs Ferry, N.Y. 10522-3401).

Typically, the polymer polyol fourth component produced using the nonaqueous dispersant stabilizer is used in the preparation of polyurethanes, particularly polyurethane foams. These polyurethane foams have improved tensile strength and load bearing without the impairment of the other physical parameters associated with a foam product.

This polyether polyol solution, which is reacted with the polyisocyanate, is a mixture from about 2% to about 20% by weight of the diol first component, and correspondingly from about 0% to about 75% by weight of the polyether polyol second component and from about 0% to about 75% by weight of the polyether polyol third component and from about 80% to about 10% of the polymer polyol fourth component. Optionally, a carbon black pigment is present in a range from about 0% to about 10%.

These percentages may be varied within the ranges stated above in order to adjust the hardness, tensile strength, and other physical properties of the polyetherpolyurethane molded article depending upon the solvents encountered and the conditions under which an end cap for a filter is to be used.

Having described the broad scope of the invention, the preferred embodiment would involve using a polyether triol second component having from about 10% to about 40% by weight of the polyether polyol solution having zero oxyethylene groups, a functionality of about 3 and a hydroxyl number of about 50 to about 60. In addition, the preferred embodiment would also include from about 10% to about 40% of a polyether triol third component having zero oxyethylene components and a hydroxyl number of about 110 to about 120. In addition, the preferred embodiment would also include from about 30% to about 70% of a polymer polyol fourth component having 10% to 20% oxyethylene components and a hydroxyl number of about 10 to about 40, with about 15% to about 35% of stryene and about 10% to about 20% of acrylonitrile and about 75% to about 45% of polyether polyol.

The combination of the polyether second component, the polyether third component, and the polymer polyol fourth component would be mixed with a preferred diol, 1,4-butanediol, where the preferred diol is present in a range from about 5% to about 15%. The overall polyol component of the polyetherpolyurethane is formed upon reaction with the polyisocyanate.

The physical properties of the molded article, e.g., oil filter cap, may be readily adjusted by altering the relative proportions, within the parameters above, of the diol crosslinker, the polyether polyol second component, the polyether polyol third component, and the polymer polyol fourth component. In addition, the molecular weights of the polyether polyol second component, the molecular weight of the polyether polyol third component, and the molecular weight of the polymer polyol fourth component can be changed to alter properties.

For instance, if the percentage of the polyether polyol third component is increased, the hardness and rigidity of the polyurethane increases, but the elongation properties are lower. If the percentage of the polyether polyol second component is increased, the hardness and rigidity of the polyurethane decreases, and the elongation increases. If the percentage of the polymer polyol fourth component increases, the hardness and rigidity of the polyurethane would increase, and the elongation would decrease. If the percentage of the diol crosslinker is increased, the hardness and rigidity of the polyurethane would increase, and the elongation would decrease.

In summary, if the molecular weight of any of the components would increase, then the hardness and rigidity of the polyurethane would decrease, with a corresponding increase in elongation.

Since the polyetherpolyurethane, in use, is blended and poured into a mold prior to affixing to the filter elements, the molding and demolding properties of the material should also be considered. An increase in the percentage of the polyether polyol second component would lower the hardness, as would a decrease in the lower molecular weight polyether polyol third component. If the butanediol or cross linker portion is increased, then the hardness can be restored.

A specific example of the polymer polyol dispersion would be a polymer content of 23% with the ratio of stryene to acrylonitrile is 70:30. A one liter reactor equipped with a stirrer, thermometer and heat exchanger, and a graduated dropping funnel, was charged with a base polyether (210 g., glycerol started, PO: 86%, EO: 14%) and a nonaqueous dispersant stabilizer (26.5 g., 0.5%). While stirring under a slight nitrogen flow, the charge was heated to 125° C. (257° F.), and a stream of styrene (141.2 g., 26.6%), acrylonitrile (60.5 g.,12%) and a polymerization initiator (Perkadox P-160® manufactured by Akzo Nobel Chemicals Inc. (2.65 g., 0.5%) dispersed in the above described base polyether (90 g.) was continuously added to the charge during a period of 120 minutes. Upon completion of the addition, the reaction mixture was maintained at 125° C.(257°) for a period of 60 minutes. The reaction mixture was then stripped of volatiles for two hours at 110° C.(230° F.), under less than 10 millimeters of mercury. The stripped reaction product was a white opaque stable dispersion.

A nonaqueous dispersant stabilizer could be prepared with a two liter reactor fitted with a mechanical stirrer, a thermometer, a temperature regulating device, a nitrogen supply and condenser, was charged with a polyether polyol (1000 G.,0.212 mols., glycerol started, PO; 85% ED: 15%, MW; 5,000) and degassed for 30 minutes under a one millimeter vacuum. The reactor content was cooled to 60° C. (140° F.) and further charged with potassium acetate (0.12 g., 0.0015 mols) and vinyltrimethoxy silane (12.6 g., 0.0085 mols) and vinyltrimethoxy silane (12.6 g., 0.0085 mols). The mixture temperature was raised to 140° C. (285° F.) under 150 milliliter/minute nitrogen flow for eight hours. The entrained gases are vented to the atmosphere. The reactor content was cooled to room temperature. The product polyether polyol was colorless and had a viscosity of 5720 c.p.s. at 25° C.(77° F.) with a residual unsaturation of 0.15 M/Q per gram.

It has been discovered that an especially preferred formulation would contain 50 parts by weight of a 3,000 molecular weight (hydroxyl number 56) polyether triol; 100 parts by weight of a 7000 molecular weight polymer polyol (hydroxyl number 23); 36 parts by weight of a polyether triol having a hydroxyl number of about 112, and about 20.22 parts by weight of 1,4 butanediol results in a polyetherpolyurethane molded article, e.g., oil filter end cap, which has an advantageous balance of hardness, elongation and rigidity, as well as the molding properties which allow it to be poured into a mold without sloshing for a smooth consistent finish.

Due to the higher viscosity nature of the urethane, flash along the edges of the end cap will not be created. If present and broken-off, the flash can enter the oil or fuel system, thereby inhibiting the flow of fluid through the filter or through the engine. The polyetherpolyurethane can become to affixed to each end of the oil filter and then cured in such a configuration that cracks do not result. As will be shown later, the physical properties of this especially preferred embodiment result in an excellent filter material.

The methylene-bridged polyarylpolyisocyanate useful in the practice of the invention is well-known to the polyurethane art and polyphenylmethane polyisocyanate component is useful in the practice of this invention and demonstrates that it is well-known to use such component in the formation of elastomers.

The functionality of these polymeric isocyanates, as they have come to be known, is greater than 2.0 as stated above. Preferably, the average functionality would be in the range of about 2.2 to about 4. The preferred range of the functionality of the polyurethane would be from about 2.2 to about 3.3 with an especially preferred range from about 2.2 to about 2.5. The urethane-forming reaction is carried out at an isocyanate index (NCO/OH) of from about 0.9 to about 1.5, preferably about 1.0 to about 1.25, and an especially preferred isocyanate index at about 1.05.

Suitable catalysts of urethane formation useful in the practice of this invention are also well-known to those skilled in the art and are added in catalytic amounts. The catalyst system useful in this system includes an organometallic catalyst such as, preferably dibutyltin dilaurate. Many organometallic catalysts are useful in the practice of this invention and are sold under the trademark RC-201™ by Rhein Chemie GmbH located at Düsseldorfer Str. 23-27, 68204 Mannheim, Germany. Often, for convenience of handling and measuring small quantities, the organometallic catalyst is used in a solution of butanediol to make it more easily handled and, since the butanediol is reacted, it does not become a contaminant. The preferred catalyst mix is usually one part organometallic catalyst to nine parts of the butanediol. In production the dilution is no longer important where larger amounts are measured and used.

Other popular catalysts for the polyurethane reaction are certain tertiary amine catalysts, such as, for example, triethylenediamine, sold by Rhein Chemie GmbH as RC-104™.

The catalysts system would be a blend of the amine catalyst and the organometallic catalyst varying from a ratio of 5:1 (metallic to amine) to about 1:5 (metallic to amine). The total catalyst system would be present in an amount of from about 0.001% by weight, to about 0.1% weight, based upon the weight of the polyol component, preferably from about 0.005% to about 0.01%, and normally less than about 0.01%. The selection and adjustment of the amount of the catalysts is well within the ordinary skill in the art, and does not, as such, form part of this invention other than its contribution to the best mode for practicing the invention.

In the practice of this invention to make the molded articles, the specific polyol component, as defined above, is mixed and reacted with the well-known methylene-bridged aromatic polyisocyanates, preferably polyphenylmethane polyisocyanate, having a functionality greater than 2, in the presence of a catalyst system. This is well-known and has long been used by those skilled in the art of preparing polyurethane elastomers.

Another component that may be optionally added is a variety of fillers or pigments to vary the color and surface treatment of the end cap if desired. A preferred black pigment is sold under the trademark DR0206™ by Plasticolors located at 2600 Michigan Avenue, P.O. Box 816, Ashtabula, Ohio 44005-0816. The amount of pigment can range from zero percent (0%) to about ten percent (10%). This is well within the skill of the practitioner, and the addition of such inert, unreactive materials to the part of the reaction mixture containing the polyether polyol is only incidental to the practice of the invention herein described and claimed.

In preparing the molded articles, i.e., end caps, to the filter elements themselves, the polyol components are mixed together at room temperature including the catalyst systems. End cap molds are typically heated to 121° C.(250° F.). The isocyanate and polyol components are mixed through an in-line static mixer and discharged into the mold for the end caps. The urethane forming mixture was allowed to react in the mold for about 60% to 80% of the gel time of the reaction mixture, from about 15 to about 18 seconds for a 25 second gel time, before insertion of one end of the filter media. This delay time would vary depending upon the gel time of the polyurethane reaction mixture used as an end cap. Insertion of the filter media into the ungelled reaction mixture allows the media, usually paper, to become bonded within its reaction structure of the polymer. The combination of filter media and the polyurethane material in the mold is then oven-cured, usually at the temperature of 121° C.(250° F.) for about 2 minutes. Greater or less time, or different temperatures may be used, as desired. Of course in a commercial operation the drying and insertion of the filter media would all be an automated operation. After curing, the filters were removed from the oven and the mold, with the process being carried out again for the other end of the filters. Use of the formulations described above result, after curing and storage at room temperature, in uncracked polyetherpolyurethane material in filter end caps. To be successful, these end caps must not separate from the filter media upon aging and remained in good contact.

Among the formulations set forth above, the best mode for carrying out the invention involves mixing the polyether polyol solutions as follows: 50 parts by weight or 24.0% of a propoxylated triol having a hydroxyl number of 56; 36 parts by weight or 17.3% of a propoxylated triol having a hydroxyl number of about 112; 100 parts or 48.0% by weight of a polymer polyol with a nonaqueous dispersant stabilizer having a hydroxyl number of 23; and 20.22 parts by weight of 1, 4 butanediol with 0.017 parts by weight of triethylene diamine catalyst and 0.017 parts by weight of dibutyltin dilaurate catalyst in a one-to-one ratio of catalysts. In a commercial operation the catalyst would probably be added without dilution. This polyol system is reacted with a polyphenylmethane isocyanate having a functionality of about 2.3 in proportions sufficient to give an isocyanate index of 1.05 within the reaction mixture. This is the especially preferred isocyanate index in the practice of this invention. The reaction mixture is found to have a gel time of about 24 seconds. A preferred polyphenylmethane isocyanate is sold under the trademark PAPI 2094™ by Dow Chemical Company located at the Dow Chemical Company having an address at P.O. Box 1655, Midland, Mich. 48641-1655. Plasticolors DR0206™ is added in an amount of 2 parts by weight or 1 percent (1%)

The reacting material is discharged into a mold preheated at 121° C. (250° F.). After about 18 seconds, one end of filter media is plunged into the reacting mixture and placed in a 121° C. (250° F.) oven to cure for a period of two minutes. The process is repeated for the other end of the filter media to form a filter cartridge. Variations of this method would be apparent to those skilled in the art depending upon the degree of sophistication of the equipment available.

Also, for testing purposes, plaques approximately 15.24 centimeters (6 inches) by 15.24 centimeters (6 inches) by about 0.212 centimeters (0.083 inches) were prepared using the various polyurethane formulations. From these plaques, the test strips were prepared in the usual manner. The foregoing formulation was found to be particularly preferred after testing.

Because of the environment within which a filter is used in an internal combustion engine, after curing the samples are removed from the oven and allowed to age at room temperature for several days. A litmus test for materials used was cracking at room temperature. When this occurred, such polyurethane end caps materials were discarded as unacceptable.

Concurrently, testing was performed on test strips from the plaques in environments that were more severe than the environment in which the filter would normally be used: Mixtures of 90% engine oil with 10% water, 100% diesel fuel, and 100% engine oil. Samples were immersed in the solvents, except for diesel fuel, at 121° C. (250° F.) with samples being pulled at 96 and 250 hours of exposure and examined. Samples were immersed in diesel fuel at 21° C. (70° F.).

The plaques were removed from the buckets containing the fluids and allowed to cool to room temperatures in freezer food storage bags. Standard tensile and test strength tests (ASTM) were performed on the dies cut from the plaques. Hardness was checked with Shore A durameters. The aging before testing was a minimum of one week. Tensile strength and tear strength samples were tested at a cross-head speed of 20 inches per minute.

The foregoing best mode description and the invention itself will be further highlighted and exemplified by the following examples. These examples are provided for purposes of illustration and are not to be considered as limiting the instant invention.

EXAMPLE

Polyetherpolyurethane oil filter end caps and test plaques were prepared using the procedure as described above. The formulations and properties are set forth below.

| | HV6 | HV3 |
|---|---|---|
| | Parts by weight | |
| Isocyanate Component: | | |
| NCO-A | 85.3 | 75.7 |
| Polyol Component: | | |
| OH-A | 50 | 50 |
| OH-B | 36 | 36 |
| OH-C | 100 | 100 |
| Chain Extender: 1,4 Butanediol | 20.22 | 17.22 |
| Catalysts: | | |
| Triethylenediamine (RC/6080) | 0.017 | 0.015 |
| Dibutyltin dilaurate (RC/201) | 0.017 | 0.015 |
| Pigment: | | |
| DR0206 Black Pigment | 2.00 | 2.00 |
| NCO Index | 1.05 | 1.05 |

GLOSSARY

| | GENERIC DESCRIPTION | TRADE-MARK | SUP-PLIER |
|---|---|---|---|
| NCO-A | A polymeric diisocyanate having a molecular weight of about 300.f = 2.3 | PAPI 2094 ™ | DOW |
| OH-A | A 1,4 butanediol chain extender | CROSSLINK-ER B ™ | RHEIN |
| OH-B | A polyether triol containing 100% PO groups having an OH # of 57.4 (3000 MW) | VORANOL 230-056 ™ | DOW |
| OH-C | A polyether triol containing 100% PO groups having an OH # of 111.5 (1500 MW) | VORANOL 230-112 ™ | DOW |
| OH-D | A polymer polyol having a non-aqueous dispersant stabilizer having an OH # of 23 (7000 MW) | VORANOL XUS-16111 ™ | DOW |
| RC/6080 | Triethylenediamine | RC/6080 ™ | RHEIN |
| RC/201 | Dibutyltin dilaurate | RC/201 ™ | RHEIN |
| DR0206 | Black Pigment (Carbon) | DR0206 ™ | PLASTI-COLORS |

The polyurethane end caps and polyurethane material thus prepared was tested as described above with results as follows:

TEST RESULTS

| FORMULATION | HV6 | HV3 |
|---|---|---|
| Unaged | | |
| Tensile Strength - Unaged | 2200 | 1998 |
| Tear Strength - Unaged | 162 | 109 |
| Hardness - Unaged (Shore A) | 89 | 88 |
| Clean Engine Oil Immersion at 250° F. for 240 hours | | |
| Tensile Strength | 1823 | 1659 |
| Tear Strength | 128 | 103 |
| Hardness | 86 | 85 |
| Clean Engine Oil Immersion at 250° F. for 500 hours | | |
| Tensile Strength | 1750 | 1473 |
| Tear Strength | 114 | 100 |
| Hardness | 86 | 85 |
| Engine Oil/Water Immersion at 250° F. for 240 hours | | |
| Tensile Strength | 1425 | 1268 |
| Tear Strength | 120 | 83 |
| Hardness | 79 | 78 |
| Engine Oil/Water Immersion at 250° F. for 500 hours | | |
| Tensile Strength | 1140 | 924 |
| Tear Strength | 115 | 73 |
| Hardness | 74 | 72 |
| Diesel Fuel Immersion at 250° F. for 240 hours | | |
| Tensile Strength | 1207 | 1183 |
| Tear Strength | 71 | 60 |
| Hardness | 87 | 88 |
| Diesel Fuel Immersion at 250° F. for 500 hours | | |
| Tensile Strength | 1234 | 970 |
| Tear Strength | 75 | 59 |
| Hardness | 85 | 84 |

Tensile Strength is in pounds per square inch (PSI). Tear Strength is in pounds per lineal inch (PLI). Hardness uses the Shore scale (Shore A).

The HV6 and HV3 polyurethanes represent formulations within the scope of this invention. Both of these materials showed good properties and strength even though the HV6 material demonstrated superior strength due to the addition of three parts of 1,4 butanediol.

As can be seen from the foregoing, the polyurethane end caps of this invention provide a substantial improvement over the prior art attempts, since the higher viscosity material will improve the appearance of the product by elimination of sloshing in the mold as well as preventing the formation of flash, which can inhibit fluid flow in the filter or engine, if broken-off from the end cap.

Those of ordinary skill in the art upon reading the foregoing description of this invention and viewing the data provided in the examples will be able to make many modifications and obvious variations while remaining within the scope of the claims of this invention without departing therefrom. Such variations are intended to be covered by the claims of this invention.

What is claimed is:

1. A high viscosity, solvent-resistant, thermoset polyetherpolyurethane comprising:

a methylene-bridged polyarylpolyisocyanate component and a polyether polyol solution combined in catalytic urethane-forming reaction where the polyether polyol solution of the urethane-forming reaction includes a diol first component from about 2% to about 20% by weight of the polyether polyol solution having a molecular weight from about 75 to about 200; a polyether polyol second component from about 0% to about 75% by weight of the polyether polyol solution having no oxyethylene groups, a functionality greater than 2 and a hydroxyl number from about 30 to about 60; a polyether polyol third component from about 0% to about 75% by weight of the polyether polyol solution having no oxyethylene groups, a functionality greater than 2 and a hydroxyl number from about 170 to about 110; and a polymer polyol fourth component, from about 80% to about 10% by weight of the polyether polyol solution having a hydroxyl number from about 20 to about 100 and having a nonaqueous dispersant stabilizer.

2. The high viscosity, solvent-resistant, thermoset polyetherpolyurethane of claim 1, wherein the functionality of the polyether polyol second component is 3 and the functionality of the polyether polyol third component is 3.

3. The high viscosity, solvent-resistant, thermoset polyetherpolyurethane of claim 1, wherein the polyether polyol second component is a polyether triol ranging from about 10% to about 40% by weight of the polyether polyol solution and having a hydroxyl number ranging from about 50 to about 60 and the polyether polyol third component is a polyether triol ranging from about 10% to about 40% by weight of a polyether polyol solution and having a hydroxyl number of about 110 and to about 120 and the polymer polyol fourth component ranging from about 70% to about 30% of the polymer polyol wherein the polymer polyol includes styrene, acrylonitrile, and polyether polyol.

4. The high viscosity, solvent-resistant, thermoset polyetherpolyurethane of claim 3, wherein the diol first component is 1,4 butanediol.

5. The high viscosity, solvent-resistant, thermoset polyetherpolyurethane of claim 3, wherein the diol first component comprises from about 2% to about 20% butanediol.

6. The high viscosity, solvent-resistant, thermoset polyetherpolyurethane of claim 1, wherein the polyether polyol solution includes a pigment.

7. The high viscosity, solvent-resistant, thermoset polyetherpolyurethane of claim 1, wherein the catalyst includes dibutyltin dilaurate.

8. The high viscosity, solvent-resistant, thermoset polyetherpolyurethane of claim 1, wherein the catalyst includes triethylenediamine.

9. The high viscosity, solvent-resistant, thermoset polyetherpolyurethane of claim 1, wherein the catalyst includes a mixture of dibutyltin dilaurate and triethylenediamine.

10. The high viscosity, solvent-resistant, thermoset polyetherpolyurethane of claim 1, wherein styrene is from about 15% to about 35% by weight of the polymer polyol fourth component and acrylonitrile is from about 10% to about 20% by weight of the polymer polyol fourth component and polyether polyol is from about 75% to about 45% by weight of the polymer polyol fourth component with the acrylonitrile and styrene polymerized together.

11. A method for molding a high viscosity, solvent-resistant, thermoset polyetherpolyurethane comprising the steps of:

mixing a diol first component from about 2% to about 20% by weight of a polyether polyol solution having a molecular weight from about 75 to about 200 with a polyether polyol second component from about 0% to about 75% by weight of the polyether polyol solution having no oxyethylene groups, a functionality greater than 2 and a hydroxyl number from about 30 to about 60 with a polyether polyol third component from about 0% to about 75% by weight of the polyether polyol solution having no oxyethylene groups, a functionality greater than 2 and a hydroxyl number from about 170 to about 110 with a polymer polyol fourth component, from about 80% to about 10% by weight of the polyether polyol solution having a hydroxyl number from about 20 to about 100 and having a nonaqueous dispersant stabilizer, to form a polyether polyol solution;

mixing a methylene-bridged polyarylpolyisocyanate component and the polyether polyol solution with a catalyst forming a polyetherpolyurethane; and discharging the polyetherpolyurethane into a heated mold.

12. The method for molding a high viscosity, solvent-resistant, thermoset polyetherpolyurethane as defined in claim 11, wherein the functionality of the polyether polyol second component is 3 and the polyether polyol third component is 3.

13. The method for molding a high viscosity, solvent-resistant, thermoset polyetherpolyurethane as defined in claim 11, wherein the polyether polyol second component is a polyether triol ranging from about 10% to about 40% by weight of the polyether polyol solution and having a hydroxyl number ranging from about 50 to about 60 and the polyether polyol third component is a polyether triol ranging from about 10% to about 40% by weight of a polyether polyol solution and having a hydroxyl number of about 110 and to about 120 and the polymer polyol fourth component ranging from about 70% to about 30% of the polymer polyol wherein the polymer polyol includes styrene, acrylonitrile, and polyether polyol.

14. The method for molding a high viscosity, solvent-resistant, thermoset polyetherpolyurethane as defined in claim 11, wherein the diol first component is 1,4 butanediol.

15. The method for molding a high viscosity, solvent-resistant, thermoset polyetherpolyurethane as defined in claim 11, wherein the diol first component of the urethane forming reaction comprises from about 2% to about 20% butanediol.

16. The method for molding a high viscosity, solvent-resistant, thermoset polyetherpolyurethane as defined in claim 11, wherein the polyether polyol solution includes a pigment.

17. The method for molding a high viscosity, solvent-resistant, thermoset polyetherpolyurethane as defined in claim 11, wherein the catalyst includes dibutyltin dilaurate.

18. The method for molding a high viscosity, solvent-resistant, thermoset polyetherpolyurethane as defined in claim 11, wherein the catalyst includes triethylenediamine.

19. The method for molding a high viscosity, solvent-resistant, thermoset polyetherpolyurethane as defined in claim 11, wherein the catalyst is a mixture of dibutyltin dilaurate and triethylenediamine.

20. The method for molding a high viscosity, solvent-resistant, thermoset polyetherpolyurethane as defined in claim 11, wherein styrene is from about 15% to about 35% by weight of the polymer polyol fourth component and acrylonitrile is from about 10% to about 20% by weight of the polymer polyol fourth component and polyether polyol is from about 75% to about 45% by weight of the polymer polyol fourth component with the acrylonitrile and styrene polymerized together.

* * * * *